(12) United States Patent
Norwood

(10) Patent No.: US 12,709,220 B2
(45) Date of Patent: Aug. 18, 2026

(54) LIGHTED STEERING WHEEL DEVICE

(71) Applicant: Charles Norwood, Allen, TX (US)

(72) Inventor: Charles Norwood, Allen, TX (US)

( * ) Notice: Subject to any disclaimer, the term of this patent is extended or adjusted under 35 U.S.C. 154(b) by 0 days.

(21) Appl. No.: 19/061,015

(22) Filed: Feb. 24, 2025

(65) Prior Publication Data

US 2025/0282285 A1 Sep. 11, 2025

Related U.S. Application Data

(60) Provisional application No. 63/561,771, filed on Mar. 6, 2024.

(51) Int. Cl.
*B60Q 3/283* (2017.01)
*B60K 35/21* (2024.01)
*B60K 35/28* (2024.01)

(52) U.S. Cl.
CPC .............. *B60Q 3/283* (2017.02); *B60K 35/21* (2024.01); *B60K 35/28* (2024.01); *B60K 2360/332* (2024.01); *B60K 2360/782* (2024.01)

(58) Field of Classification Search
CPC ........ B60Q 3/283; B60K 35/21; B60K 35/28; B60K 2360/332; B60K 2360/782; B60K 2360/338
See application file for complete search history.

(56) References Cited

U.S. PATENT DOCUMENTS 6,296,380 B1 10/2001 Dawli
D475,334 S 6/2003 Peng
D623,571 S 9/2010 Cook
9,308,856 B2 4/2016 Lisseman
2006/0070795 A1* 4/2006 Meissner .............. B62D 1/046 180/446
2011/0187518 A1* 8/2011 Strumolo ............ B62D 15/029 340/438
2014/0111324 A1 4/2014 Lisseman
2014/0139341 A1* 5/2014 Green .................... A61B 5/163 340/576
2014/0159887 A1* 6/2014 Piasecki .................. B60Q 9/00 340/438
2015/0375677 A1* 12/2015 Salter ........................ F21V 9/32 362/510

(Continued)

*Primary Examiner* — Christopher E Dunay
(74) *Attorney, Agent, or Firm* — Brennan, Manna & Diamond, LLC

(57) ABSTRACT

A lighted steering wheel device is provided. The device is comprised of a steering wheel that integrates customizable and functional lighting features to enhance both safety and aesthetics. The steering wheel comprises various materials and configurations, with embedded flexible LED strips encased in impact-resistant, UV-protected casings, capable of displaying a wide range of static or dynamic light patterns. These patterns can be synchronized with vehicle systems, such as flashing red for emergency braking or reacting to turn signals, and brightness can adjust based on vehicle speed. The device includes a control interface embedded in the wheel and offers further customization via a mobile app, which provides remote access to light settings and synchronization features. Additionally, the device can generate safety alerts, utilizing proximity sensors, GPS integration, and haptic feedback for a multisensory driver experience, with an illuminated emblem adding a complementary design element.

4 Claims, 2 Drawing Sheets

(56) References Cited

U.S. PATENT DOCUMENTS

| | | | | |
|---|---|---|---|---|
| 2018/0372303 | A1* | 12/2018 | Na | F21S 41/333 |
| 2019/0023129 | A1* | 1/2019 | Hüger | B60K 35/25 |
| 2024/0181962 | A1* | 6/2024 | Kim | B62D 15/029 |

* cited by examiner

LIGHTED STEERING WHEEL DEVICE

CROSS-REFERENCE TO RELATED APPLICATION

The present application claims priority to, and the benefit of, U.S. Provisional application Ser. No. 63/561,771, which was filed on Mar. 6, 2024, and is incorporated herein by reference in its entirety.

FIELD OF THE INVENTION

The present invention relates generally to the field of steering wheels. More specifically, the present invention relates to a lighted steering wheel device with integrated, customizable LED lighting that enhances safety and aesthetics, featuring dynamic modes responsive to vehicle signals and adjustable through an embedded control interface or a mobile app. The device also includes safety-enhancing features like GPS-based alerts and haptic feedback for a multisensory driving experience. Accordingly, the present disclosure makes specific reference thereto. Nonetheless, it is to be appreciated that aspects of the present invention are also equally applicable to other like applications, devices, and methods of manufacture.

BACKGROUND

Vehicle customization has long been a popular trend among automobile enthusiasts, allowing individuals to personalize their driving experience and express their unique styles. Common customization options include aftermarket wheels, interior lighting, audio systems, and various exterior modifications. However, one critical area that remains underserved is the customization of the steering wheel. The steering wheel is not only a central control interface for the driver but also a prominent aesthetic element within the vehicle's interior. Despite its importance, available options for steering wheel customization are limited, restricting users' ability to tailor this essential component to their preferences.

In addition to aesthetic customization, there is a growing emphasis on enhancing vehicle safety through innovative features. Even minor traffic delays caused by missed stoplights, stop signs, or interactions with other vehicles can escalate into serious accidents and injuries. Traditional safety systems primarily focus on passive measures, such as seat belts and airbags, or active measures like automatic braking systems. However, there is a noticeable gap in proactive, user-integrated safety solutions that can alert drivers to potential hazards in real time.

The intersection of customization and safety presents an opportunity to address these gaps. A steering wheel that not only reflects the driver's personal style but also incorporates intelligent safety features could significantly enhance both the aesthetic and functional aspects of vehicle interiors.

Therefore, there exists a long-felt need in the art for the Lighted Steering Wheel Device that enables enhanced aesthetic customization options for vehicle interiors, allowing drivers to personalize their steering wheels to match their preferences. There also exists a long-felt need in the art for the Lighted Steering Wheel Device that provides real-time visual alerts, seamlessly integrated into the steering wheel, to inform drivers of upcoming traffic signals, obstacles, or road hazards. Moreover, there exists a long-felt need in the art for the Lighted Steering Wheel Device that improves driver situational awareness without causing distraction, by offering intuitive, ambient lighting cues that promote safer driving habits.

The subject matter disclosed and claimed herein, in one embodiment thereof, comprises a lighted steering wheel device. The device is comprised of a steering wheel that integrates customizable and functional lighting features to enhance both safety and aesthetics. The steering wheel comprises various materials and configurations, with embedded flexible LED strips encased in impact-resistant, UV-protected casings, capable of displaying a wide range of static or dynamic light patterns. These patterns can be synchronized with vehicle systems, such as flashing red for emergency braking or reacting to turn signals, and brightness can adjust based on vehicle speed. The device includes a control interface embedded in the wheel and offers further customization via a mobile app, which provides remote access to light settings and synchronization features. Additionally, the device can generate safety alerts, utilizing proximity sensors, GPS integration, and haptic feedback for a multisensory driver experience, with an illuminated emblem adding a complementary design element.

In this manner, the lighted steering wheel device of the present invention accomplishes all the forgoing objectives and combines advanced LED lighting technology with customizable design elements, allowing drivers to tailor the appearance of their steering wheel to their unique style. The device also integrates smart sensors and connectivity features, which provide real-time visual alerts through strategically placed lights, ensuring that drivers receive crucial safety information without diverting their attention from the road. By offering both aesthetic and functional enhancements, the Lighted Steering Wheel Device creates a more engaging, personalized, and safer driving experience.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a lighted steering wheel device. The device is comprised of a steering wheel, which can be configured in various shapes, sizes, and materials, including leather, suede, or carbon fiber. These materials may provide durability and a premium feel while complementing integrated lighting features.

The steering wheel incorporates at least one flexible LED strip, which can be embedded along different areas such as the inner or outer rim. The LED strip is protected by a durable casing designed to withstand heat, UV exposure, and mechanical stress. It can display a wide range of colors and lighting effects, enhancing the aesthetic appeal and functionality of the steering wheel.

The LED strip offers multiple user-configurable modes, including static lighting, dynamic effects like pulsing and gradients, and reactive features that respond to vehicle signals. Examples include flashing red for emergency braking or syncing with turn signals. The device can also adjust brightness based on vehicle speed for optimal visibility.

The device includes a control interface embedded in the steering wheel, featuring physical buttons or dials for managing lighting settings without driver distraction. This interface enables users to easily toggle through lighting modes and effects, ensuring safe and intuitive operation.

The device integrates with vehicle safety systems, using the LED strip to provide visual alerts such as pulsing red lights for proximity warnings or flashing indicators for lane departure and collision risks. GPS integration further enhances functionality by triggering alerts at intersections and traffic signals.

An illuminated vehicle emblem, located at the center of the steering wheel, adds a customizable lighting feature. Its glow can be adjusted in brightness and color through the main control interface, complementing the overall design.

The device can be customized via a mobile application, which connects wirelessly through a transmitter like Bluetooth. The app allows remote management of lighting settings, effect synchronization, and other preferences, offering convenience and flexible control.

A vibration motor integrated into the steering wheel provides haptic feedback, delivering tactile alerts that work alongside visual signals. This feature enhances driver awareness by adding a physical dimension to safety alerts, such as warnings for lane departure or emergency braking.

Accordingly, the lighted steering wheel device of the present invention is particularly advantageous as it combines advanced LED lighting technology with customizable design elements, allowing drivers to tailor the appearance of their steering wheel to their unique style. The device also provides real-time visual alerts through strategically placed lights, ensuring that drivers receive crucial safety information without diverting their attention from the road. By offering both aesthetic and functional enhancements, the Lighted Steering Wheel Device creates a more engaging, personalized, and safer driving experience that overcomes the limitations of existing steering wheels known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
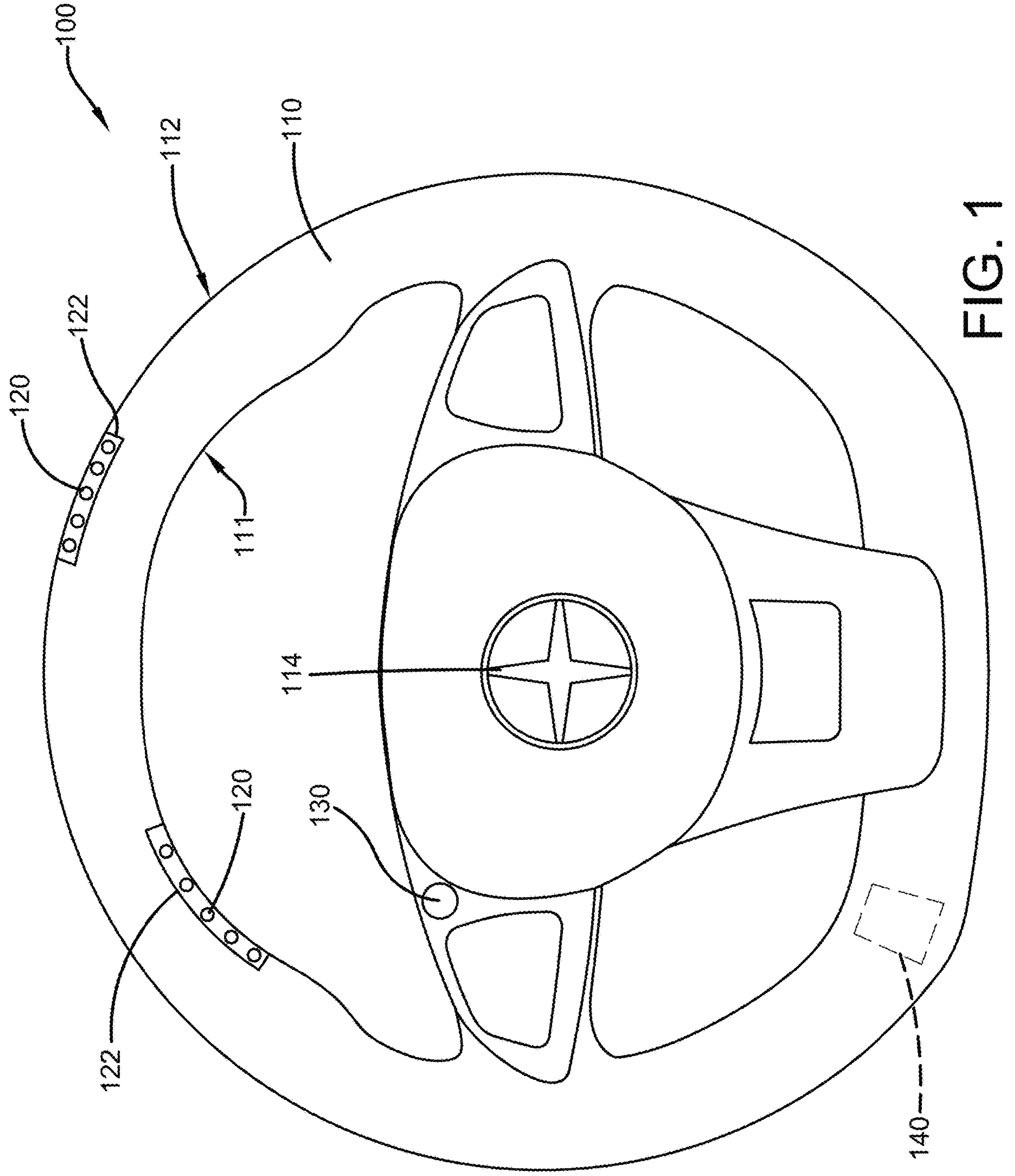
FIG. 1 illustrates a front view of one potential embodiment of a lighted steering wheel device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for the Lighted Steering Wheel Device that enables enhanced aesthetic customization options for vehicle interiors, allowing drivers to personalize their steering wheels to match their preferences. There also exists a long-felt need in the art for the Lighted Steering Wheel Device that provides real-time visual alerts, seamlessly integrated into the steering wheel, to inform drivers of upcoming traffic signals, obstacles, or road hazards. Moreover, there exists a long-felt need in the art for the Lighted Steering Wheel Device that improves driver situational awareness without causing distraction, by offering intuitive, ambient lighting cues that promote safer driving habits.

The present invention, in one exemplary embodiment, is comprised of a lighted steering wheel device. The device comprises a steering wheel that can be designed in various shapes, sizes, and materials, such as leather, suede, or carbon fiber. These materials are selected for their durability and premium quality, complementing the integrated lighting features.

The steering wheel features at least one flexible LED strip, embedded along areas like the inner or outer rim. The LED strip is housed within a durable casing that resists heat, UV exposure, and mechanical stress. It is capable of displaying a wide range of colors and lighting effects, enhancing both the look and functionality of the steering wheel.

The LED strip provides several user-configurable modes, including static colors, dynamic effects like pulsing and gradients, and reactive patterns responsive to vehicle signals. Examples include flashing red for emergency braking or synchronizing with turn signals. Brightness can be adjusted based on vehicle speed to improve visibility.

A control interface is embedded in the steering wheel, with physical buttons or dials for managing lighting settings. This interface allows users to seamlessly switch between modes and effects, ensuring safe and intuitive use while driving.

The device integrates with vehicle safety systems, employing the LED strip for visual alerts, such as pulsing red lights for proximity warnings or flashing indicators for lane departure and collision risks. GPS functionality adds another layer of alerts, activating lights near intersections and traffic signals.

An illuminated vehicle emblem, positioned at the center of the steering wheel, offers a customizable lighting element. The brightness and color of the emblem can be adjusted via the main control interface, enhancing the overall design.

Customization is further enhanced through a mobile application, which connects wirelessly via a transmitter like Bluetooth. This app provides remote access to manage lighting settings, synchronize effects, and configure other preferences for added convenience.

A vibration motor integrated into the steering wheel delivers haptic feedback, providing tactile alerts that accompany visual signals. This feature increases driver awareness by adding a physical aspect to safety notifications, such as lane departure or emergency braking alerts.

Overall, the lighted steering wheel device combines advanced LED technology with customizable elements, enabling drivers to personalize their steering wheel's appearance. It also provides critical real-time visual alerts, ensuring safety information is effectively conveyed without distracting the driver. This blend of aesthetic and functional improvements offers a more engaging, personalized, and safer driving experience, addressing the limitations of traditional steering wheels.

Referring initially to the drawings, FIG. 1 illustrates a front view of one potential embodiment of a lighted steering wheel device 100 of the present invention in accordance with the disclosed architecture.

The device 100 provides functional and customizable lighting features integrated into a vehicle steering wheel, enhancing the safety of the driving experience while also offering an appealing aesthetic for drivers who appreciate both style and functionality.

The device 100 is comprised of a steering wheel 110. The steering wheel 110 may vary in size, shape, and configuration and may include, but is not limited to, circular, oval, or rectangular designs. The steering wheel 110 may be fabricated from a range of materials, including but not limited to leather, suede, carbon fiber, and other durable or premium finishes that complement the lighting features of the device 100.

The steering wheel 110 is comprised of at least one flexible LED strip 120, which is embedded along the inner rim 111, outer rim 112, and/or potentially any other designated area on the wheel 110. The LED strip 120 is enclosed within a thermally durable and impact-resistant casing 122, designed to withstand temperature fluctuations, UV exposure, and mechanical stress, ensuring the lighting components maintain long-term reliability and performance. The LED strip 120 can emit light in any color or combination of colors.

Users have the option to configure the LED strip 120 in several modes to suit their preferences and driving environment. For example, a static color option allows for a steady glow to be emitted that enhances the interior ambiance without distracting the driver. Additionally, the LED strip 120 can be programmed with dynamic lighting effects, including but not limited to breathing, pulsing, and gradient transitions. These lighting patterns can be synchronized with the vehicle's existing ambient lighting for a cohesive and immersive visual experience. The LED strip 120 also features reactive modes that interface with the vehicle's onboard sensors and signaling systems. For example, the LED strip 120 can flash bright red in response to emergency braking or emit yellow flashes in sync with the vehicle's turn signals. The device 100 can further adjust the brightness of the LED strip 120 based on vehicle speed, enhancing visibility at higher speeds as needed.

To facilitate case of use, the device 100 is comprised of a control interface 130. This interface may include physical buttons or a selector dial integrated directly into the steering wheel 110, allowing drivers to manage lighting settings without distraction. The control interface 130 provides an intuitive way for drivers to engage various lighting modes and effects, enabling safer interaction with the device while on the road.

In addition to the aesthetic features, the device 100 is designed to operate in tandem with the vehicle's existing safety sensors. For instance, the device 100 can generate proximity alerts by pulsing the LED strip 120 in red when an obstacle is detected in the vehicle's vicinity. With GPS integration into the vehicle, the device 100 can also detect upcoming intersections and traffic signals, prompting the LEDs to flash as the vehicle approaches stop signs or red lights. Furthermore, the LED strip 120 can enhance the vehicle's alert system by flashing specific colors to indicate lane departure warnings or potential collision risks. These alerts are configured to be distinct and recognizable, ensuring they are distinguishable from purely decorative lighting modes.

The device 100 may further include an illuminated vehicle emblem 114 located at the center of the steering wheel 110. The emblem 114 can be backlit with a subtle glow or set to emit a more prominent light, with brightness and color options adjustable through the main control interface 130. This feature provides an additional customizable element that complements the lighting design of the steering wheel.

Figure 2:
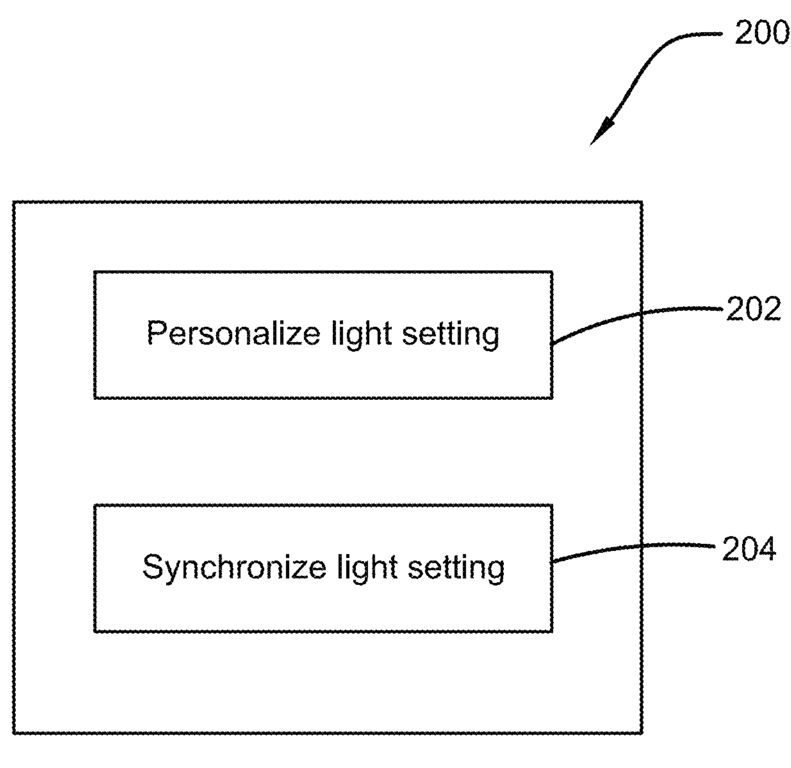
FIG. 2 illustrates a graphical view of a mobile application of one potential embodiment of a lighted steering wheel device of the present invention in accordance with the disclosed architecture.

Both the LED strip 120 and the emblem 114 can also be customized via a mobile application 200 (as seen in FIG. 2), which is in wireless electrical communication with the device 100 through at least one wireless transmitter 150 such as but not limited to a Bluetooth transmitter. The mobile application 200 enables users to personalize various light settings 202, synchronize lighting effects 204 with other in-car systems, and manage other device preferences. This application-based control offers convenient remote access to the device's 100 customization options and allows users to update settings without requiring direct interaction with the steering wheel.

In one embodiment, haptic feedback is integrated into the steering wheel 110 via at least one vibration motor 140. This feature provides tactile alerts that operate in conjunction with the visual signals, delivering a multisensory approach that enhances driver awareness of certain safety features. The haptic feedback can serve as an additional alert mechanism for lane departure warnings, emergency braking alerts, and other critical safety notifications, providing a physical cue that complements the visual indicators.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "lighted steering wheel device" and "device" are interchangeable and refer to the lighted steering wheel device 100 of the present invention.

Notwithstanding the forgoing, the lighted steering wheel device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the lighted steering wheel device 100 as shown in the FIGS. are for illustrative purposes only, and that many other sizes and shapes of the lighted steering wheel device 100 are well within the scope of the present disclosure. Although the dimensions of the lighted steering wheel device 100 are important design parameters for user convenience, the lighted steering wheel device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lighted steering wheel device comprising:

a steering wheel;

an LED strip embedded within the steering wheel and enclosed in a casing, the LED strip being configured to operate in a lighting mode including a static, a dynamic, and a reactive mode in response to a vehicle safety sensor and a vehicle signaling system;

a vibration motor;

an emblem;

a control interface integrated into the steering wheel for selecting the lighting mode; and a mobile application configured to wirelessly communicate with the steering wheel assembly for remotely customizing the lighting mode and synchronizing a lighting effect; and wherein the emblem is an illuminated emblem that is adjustable in color and brightness via the control interface;

wherein the control interface comprises a selector dial integrated into the steering wheel; and further wherein the LED strip is configured to emit yellow flashes synchronized with a vehicle's turn signal and provide a lighting cue as a lane departure warning.

2. The lighted steering wheel device of claim 1, wherein the vibration motor provides a haptic feedback for an emergency braking alert.

3. The lighted steering wheel device of claim 1, wherein the LED strip is positioned on an inner rim of the steering wheel.

4. The lighted steering wheel device of claim 1, wherein the LED strip is positioned on an outer rim of the steering wheel.

* * * * *